United States Patent

Honda

[11] Patent Number: 6,069,980
[45] Date of Patent: *May 30, 2000

[54] ADAPTIVE CHARACTER IMAGE GENERATION AND SYNTHESIS

[75] Inventor: Norikazu Honda, Kanagawa-ken, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/582,181

[22] Filed: Jan. 2, 1996

[30] Foreign Application Priority Data

Jan. 10, 1995 [JP] Japan .................................. 7-001793
Nov. 22, 1995 [JP] Japan .................................. 7-304372

[51] Int. Cl.$^7$ ................................................ G06K 9/40
[52] U.S. Cl. .......................... 382/268; 382/250; 382/284; 382/298
[58] Field of Search .................................... 382/284, 264, 382/232, 248, 250, 268, 298; 358/450, 433, 462, 467, 452; 395/117, 947, 167–172; 348/420; 345/435, 439, 113, 127–131

[56] References Cited

U.S. PATENT DOCUMENTS

| | | |
|---|---|---|
| 4,581,710 | 4/1986 | Hasselmeier ........................... 364/523 |
| 4,750,212 | 6/1988 | Yokomizo ............................... 382/284 |
| 4,947,264 | 8/1990 | Narusawa .................................. 386/18 |
| 5,021,891 | 6/1991 | Lee ........................................... 382/250 |
| 5,086,434 | 2/1992 | Abe et al. ............................... 358/450 |
| 5,333,212 | 7/1994 | Ligtenberg ............................. 382/250 |
| 5,345,317 | 9/1994 | Katsuno et al. ....................... 358/433 |
| 5,377,330 | 12/1994 | Kubota et al. ......................... 382/284 |
| 5,517,327 | 5/1996 | Nakatani et al. ...................... 358/462 |
| 5,801,846 | 9/1998 | Nobuta ................................... 358/500 |

*Primary Examiner*—Amelia Au
*Assistant Examiner*—Timothy M. Johnson
*Attorney, Agent, or Firm*—Fitzpatrick Cella Harper & Scinto

[57] ABSTRACT

The present invention performs coding with little deterioration in the image quality of a character image when block coding is performed by synthesizing the character image on an image. To achieve this object, an image processing apparatus of this invention includes a generating unit for generating character image data, an image synthesizing unit for synthesizing the character image data and another image data, and a coding unit for block-coding the image data synthesized by the synthesizing unit. In generating the character image data by the generating unit, a size of a unit pixel for forming character image data is a fraction of an even number or an integer multiple of a block size to be block-coded by the coding unit. The synthesizing unit synthesizes the image data such that each unit pixel does not cross a plurality of blocks.

6 Claims, 6 Drawing Sheets

ADAPTIVE CHARACTER IMAGE GENERATION AND SYNTHESIS

BACKGROUND OF THE INVENTION

The present invention relates to an image processing apparatus and an image processing method of coding an image.

Natural images such as photographs are sometimes synthesized with characters and compressed by coding. In this processing, a character pattern corresponding to characters to be synthesized is read out from a font memory, synthesized on a natural image stored in an image memory, and coded by, e.g., JPEG coding. If the font is especially small, it is enlarged before being synthesized.

In the above conventional method, however, since the JPEG coding performs coding in units of 8×8 blocks, a character crosses coding blocks depending on the enlargement ratio of a font to be synthesized or on the position of synthesis. This increases high-frequency components in the blocks or increases asymmetry between the blocks, giving rise to a block distortion unique to the JPEG coding.

Also, since character images contain a large amount of high-frequency components, the code length of a character image tends to increase in comparison with the simplicity of the image. Unfortunately, the JPEG coding performs irreversible coding by cutting off high-frequency components, and so the image quality of particularly a character image deteriorates.

SUMMARY OF THE INVENTION

The present invention has been made to solve the above conventional problems, and has as its object to perform coding with little deterioration in the image quality of a character image when block coding is performed by synthesizing the character image on an image.

To achieve the above object, one preferred embodiment of the present invention provides an image processing apparatus comprising generating means for generating character image data, image synthesizing means for synthesizing the character image data and another image data, and coding means for block-coding the image data synthesized by the synthesizing means, wherein in generating the character image data by the generating means, a size of a unit pixel for forming character image data is a fraction of an even number or an integer multiple of a block size to be block-coded by the coding means, and the synthesizing means synthesizes the image data such that each unit pixel does not cross a plurality of blocks.

It is another object of the present invention to perform coding with little deterioration in the image quality of a header image when block coding is performed by synthesizing header image data indicating communication information on another image data.

It is still another object of the present invention to suppress deterioration in the image quality of a character image when irreversible coding is performed by synthesizing the character image on another image.

It is still another object of the present invention to perform coding with little deterioration in the image quality of a character image when image data containing character image data is irreversibly coded in units of blocks and transmitted.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Embodiments according to the present invention will be described in detail below with reference to the accompanying drawings. Note that the embodiments will be described by taking an apparatus for performing JPEG coding as an example, but the present invention is not limited to these embodiments. That is, the present invention is applicable to any apparatus which performs block coding.

(First Embodiment)

Figure 1:
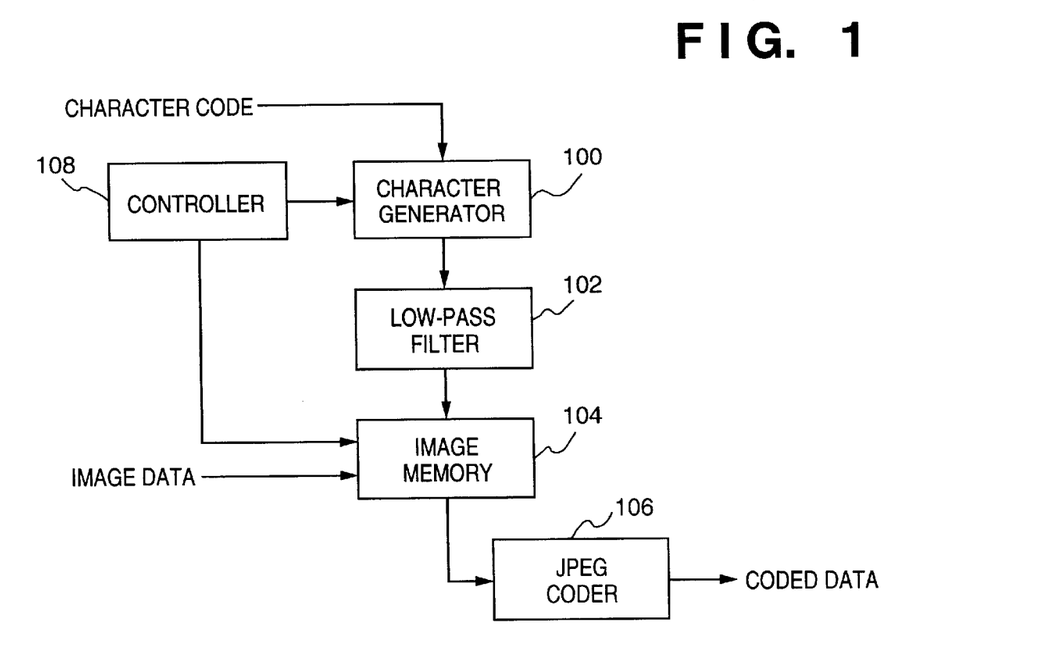
FIG. 1 is a block diagram showing the configuration of an image processing apparatus according to the first embodiment of the present invention.

FIG. 1 is a block diagram showing the configuration of a coding unit of an image processing apparatus according to the first embodiment of the present invention.

In FIG. 1, a character generator 100 generates a character image corresponding to an input character code from a CPU (not shown) or the like. If the font is small, a controller 108 (to be described later) sets an enlargement ratio so as to properly enlarge the font. Although details will be described later, the character generator 100 enlarges the font by the power of 2.

A low-pass filter 102 reduces high-frequency components of the generated character image. As described earlier, the code length of a character image tends to increase because the image contains a large amount of high-frequency components. However, the code length can be decreased without largely deteriorating the image quality if high-frequency components are cut off by proper low-pass filter processing.

An image memory 104 stores natural images such as input photographs or CG images. The character image subjected to the low-pass filter processing is stored at a predetermined address of the image memory 104 by the controller 108 and synthesized on, e.g., a natural image.

A JPEG coder 106 codes the image stored in the image memory 104 by a JPEG coding method.

The coded data thus obtained is stored in a storage device or transmitted.

Figure 2:
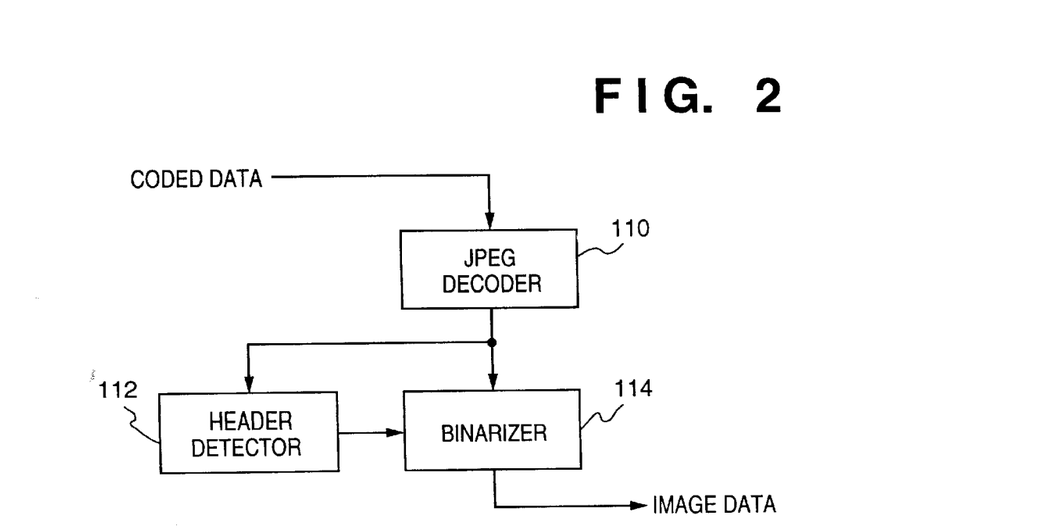
FIG. 2 is a block diagram showing the configuration of a decoding unit of the first embodiment.

FIG. 2 is a block diagram showing the configuration of a decoding unit of this embodiment.

In FIG. 2, a JPEG decoder 110 decodes the input coded data which is coded by the JPEG method.

A header detector 112 detects the header of the decoded image. Since the detected header of the image is constituted by the character image, the image data in that portion is binarized by a binarizer 114. This binarization is done by converting, e.g., 8-bit image data into 00H or FFH in accordance with a slice level set by a CPU (not shown).

The image data thus obtained is displayed on a monitor, printed by a printer, or stored in a storage device.

Figure 3:
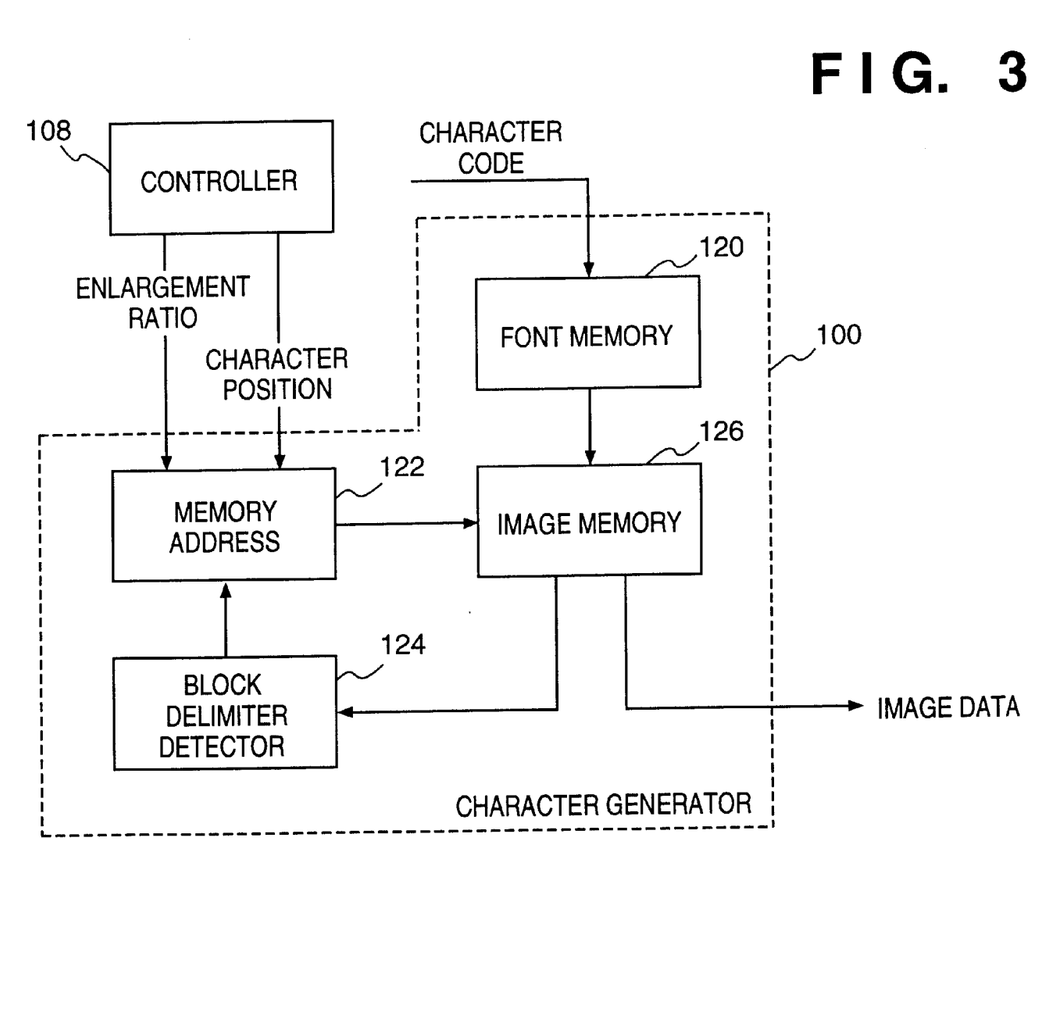
FIG. 3 is a block diagram showing a detailed configuration of a character generator.

FIG. 3 is a block diagram showing a detailed configuration of the character generator 100.

The character generator 100 reads out a character font corresponding to an input character code from a font memory 120, develops the character font into image data, and stores the image data in an image memory 126 so that pixels of characters delimit blocks when JPEG coding is performed. If the font size is small, the character generator 100 appropriately enlarges the font. Generally, the block size consists of 8×8 pixels. Therefore, when the enlargement ratio is set to 2×2, 4×4, 8×8 . . . , character pixels do not cross the delimiters (boundaries) between blocks. The synthesis positions of characters are set by shifting a memory address 122 on the basis of block delimiters detected by a block delimiter detector 124, so that character pixels delimit the blocks.

In this manner the character generator 100 stores the image data in the image memory 126 so that character pixels do not cross the block boundaries.

Figure 4:
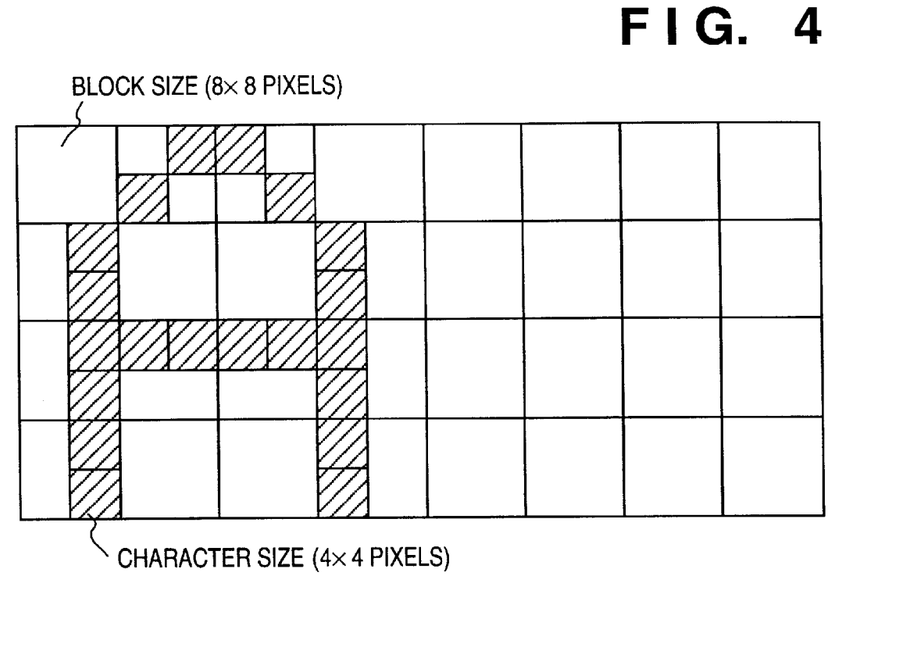
FIG. 4 is a view showing an example when a character enlargement ratio is 4 and a block size is 8.

FIG. 4 is a view showing an example when the character enlargement ratio is 4×4 and the block size consists of 8×8 pixels. The enlargement ratio is set at 4×4, and the positions of character pixels are shifted in accordance with the block size. Consequently, character pixels do not cross the block boundaries. When JPEG coding is performed, therefore, high-frequency components are reduced, and a block distortion can be decreased accordingly.

In this embodiment as described above, after a character image is obtained by developing a font corresponding to a character code, a code amount can be decreased with a minimum deterioration in the image when the image data is subjected to JPEG coding.

In FIG. 1, coding can also be performed without using the low-pass filter 102. When character synthesis (enlargement ratio is, e.g., 2×2, 4×4, 8×8, 16×16, or 24×24) as shown in FIG. 4 is performed in this way, the compression efficiency is improved. That is, it is possible to suppress deterioration of a character image by performing control such that the size of a unit pixel of the character image is a fraction of an even number or an integer multiple of the coding block size (8×8).

(Second Embodiment)

An image processing apparatus according to the second embodiment of the present invention will be described below. In the second embodiment, the same reference numerals as in the first embodiment denote the same parts, and a detailed description thereof will be omitted.

A method of decreasing a coding operation amount and a method of decreasing a code amount by using a character image coding method will be described below.

The method of decreasing an operation amount is to perform coding without performing any DCT operation by using the fact that a character pixel pattern in a block is determined from the relationship between the block size and the enlargement ratio.

Figure 5:
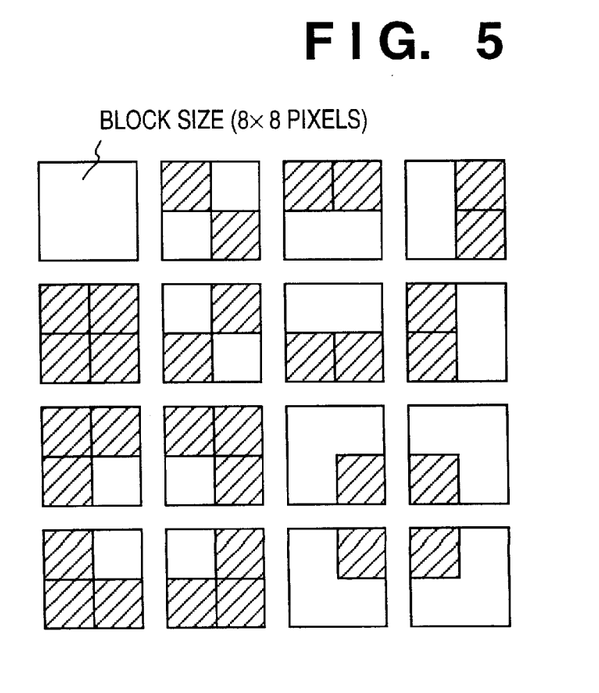
FIG. 5 is a view showing pixel patterns in one block when an enlargement ratio is 4.

For example, when the enlargement ratio is 4×4, pixel patterns in one block (8×8) are limited to 16 patterns as illustrated in FIG. 5. Accordingly, a DCT operation can be omitted if DCT coefficients of these 16 patterns are previously stored. Use of the symmetry of a pattern can further decrease the DCT coefficients to be stored. Especially when the enlargement ratio is 8×8 (an integer multiple of the block size) or larger, all pixels in one block are white or black, and so all the 63 AC components of the DCT coefficient are zeros. Therefore, coding can be performed only by calculating the DC component. Also, if character data is fixed and a pixel pattern of an image representing the character pattern remains unchanged, it is possible to previously store the data as coded data.

To decrease an operation amount by using the above method, a JPEG coder 106 in FIG. 1 stores DCT coefficients corresponding to input enlargement ratios from a controller 108 and pixel patterns.

The method of decreasing a code amount of a character image is to code only a minimum necessary number of DCT coefficients by using a character image quantization table, in cases where an image to be coded is obviously a character image such as a header.

Figure 6:
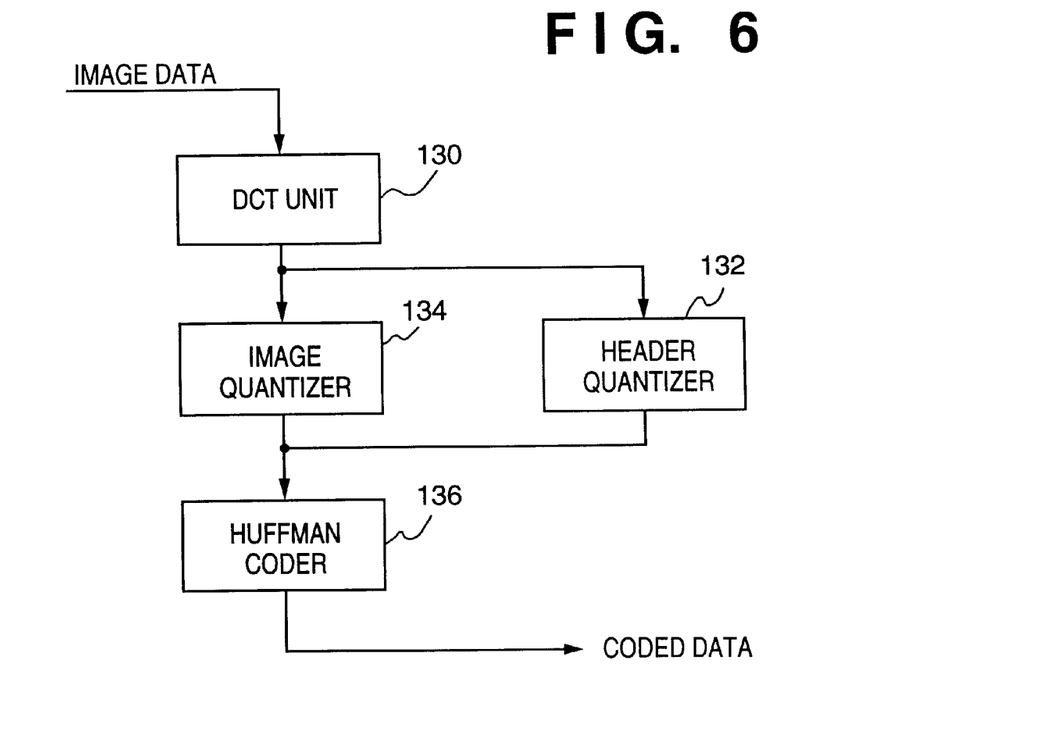
FIG. 6 is a block diagram for explaining a coding unit according to the second embodiment of the present invention.

FIG. 6 is a block diagram showing the configuration of a coder using this method. FIG. 6 corresponds to the internal configuration of the JPEG coder 106 in FIG. 1.

In FIG. 6, a DCT unit 130 performs a DCT operation for input blocked image data. A header quantizer 132 recognizes a header or the like from the synthesis position of an input character image from the controller 108 and quantizes an image constituted by the character image.

An image quantizer 134 quantizes an image except for the image constituted by a character image such as a header. A Huffman coder 136 codes the output quantized data from the header quantizer 132 and the image quantizer 134. If the character enlargement ratio in FIG. 4 is 4×4, the number of DCT coefficients required to restore the character image is four for low-frequency components, and other coefficients can be zeros, as illustrated in FIG. 7.

Figure 7:
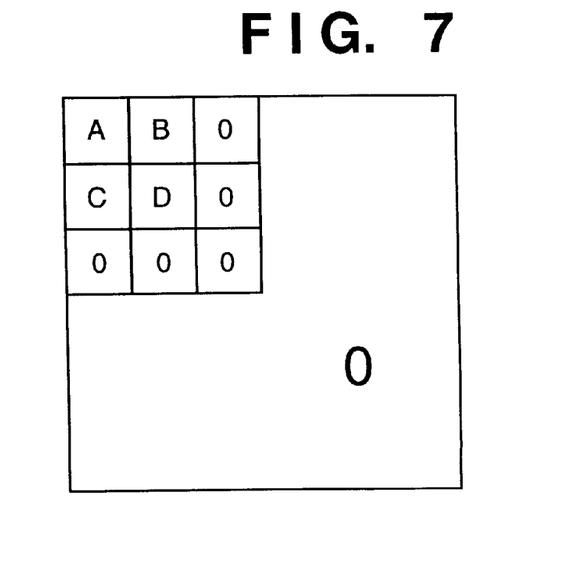
FIG. 7 is a view showing examples of DCT coefficients required to restore a character image.

That is, the quantization table of the header quantizer 132 need only quantize four DCT coefficients A to D, FIG. 7, and set the quantization results of other DCT coefficients to zeros. Consequently, the code amount of a character image generated by the character generator 100 can be decreased.

The code amount can also be decreased by optimizing the Huffman table.

Note that when the above coding method is used on the coding side, the decoding side is so designed as to detect a character image region such as a header and switch a header reverse quantizer and an image reverse quantizer.

In this embodiment as described above, it is possible to decrease the coding operation amount and the code amount of a character image such as a header.

The methods described in first and second embodiments can be combined voluntarily.

(Third Embodiment)

An embodiment in which the above system is applied to an image communication system such as a facsimile system will be described below.

Figure 8:
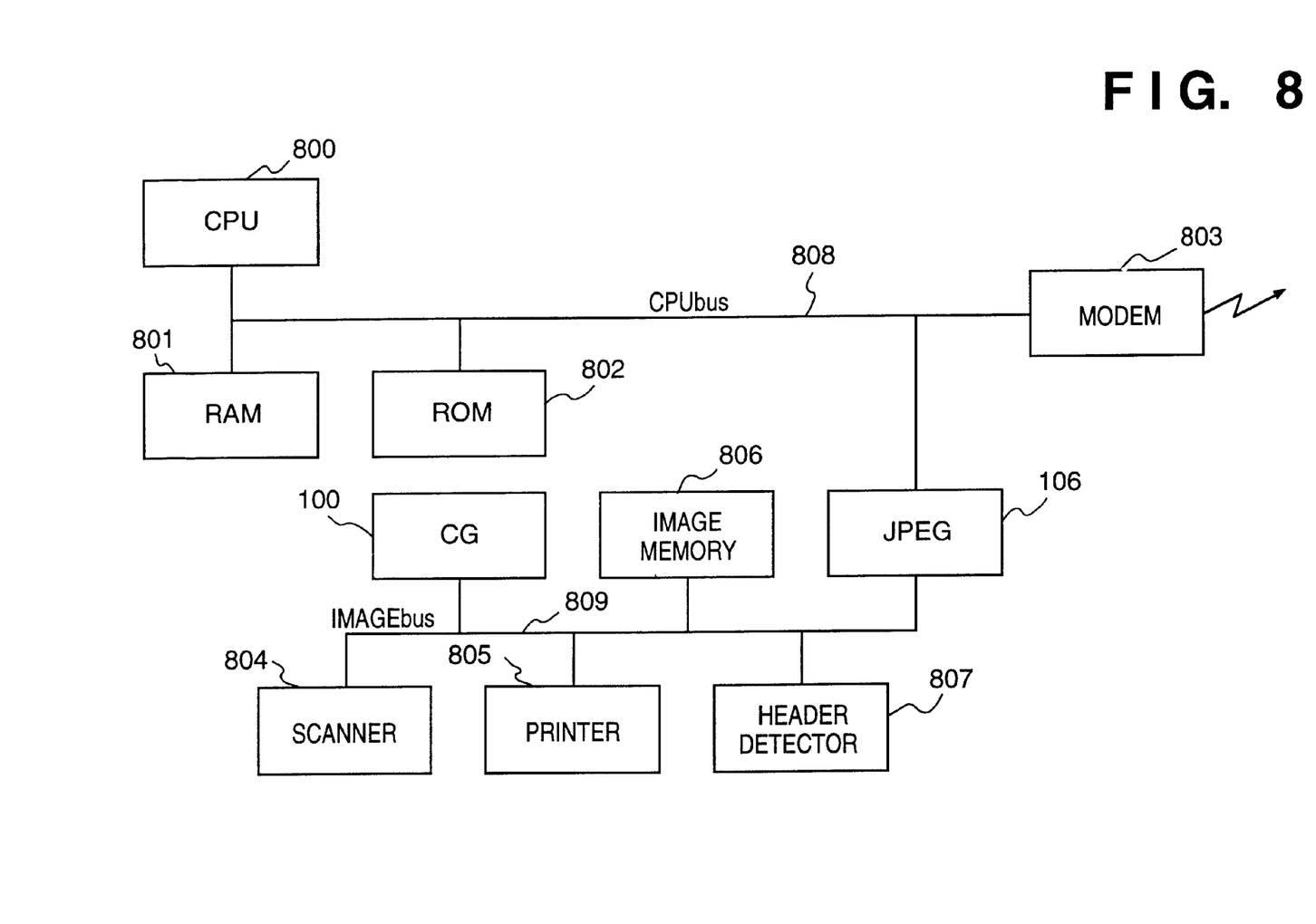
FIG. 8 is a block diagram of a facsimile system.

FIG. 8 shows the configuration of this image communication system. The system has a JPEG coder 106 and a character generator 100 described previously and also includes a CPU 800 for controlling the overall system, a ROM 801, a RAM 802, a modem 803 for transmitting image data, a scanner 804 for reading image data, a printer 805 for recording an image, an image memory 806 for storing image data, and a header detector 807.

This system is entirely controlled by the CPU 800 and has two buses, a CPU bus 808 for transmitting coded data of an image and an IMAGE bus 809 for JPEG-coding image data and transferring scanner and printer data.

The operation of the system will be briefly described below. In transmitting image data, in order to generate characters of a header (the term "header" will be used in the same meaning hereinafter) of a read image, the CPU 800 generates character image data in the character generator (CG 100) and stores a character image of the header in the image memory 806. Meanwhile, the CPU 800 prepares to input image data from the scanner 804.

The CPU 800 then causes the JPEG coder 106 to perform JPEG coding for the character image in the image memory 806, stores the coded data in the RAM 801 on the CPU bus 808, and makes the modem 803 transmit the image data. When completing the processing for the header, the CPU 800 starts image reading by the scanner 804, transfers the read image data to the image memory 806 on the IMAGE bus 809, and stores the data in the image memory 806.

Figure 9:
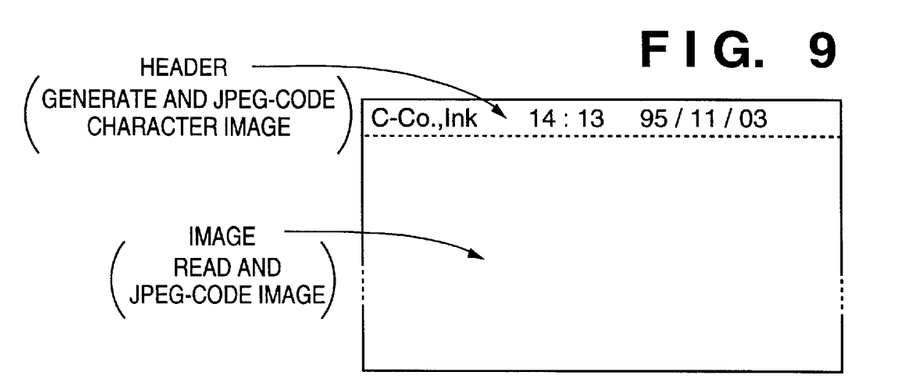
FIG. 9 is a view showing image synthesis in communication.

Finally, the CPU 800 performs JPEG coding for synthetic image data formed by synthesizing the character image data of the header and the read image data, and transmits the coded image data via the modem 803. FIG. 9 shows an example of this image data.

In receiving the image data, the coded data is temporarily stored in the RAM 801 via the modem 803. The JPEG coder 106 decodes the coded data into the image data, and the header detector 807 detects whether the image data is the header. The header is binarized as a character image, and image data other than the header is directly output as an image.

Figure 10:
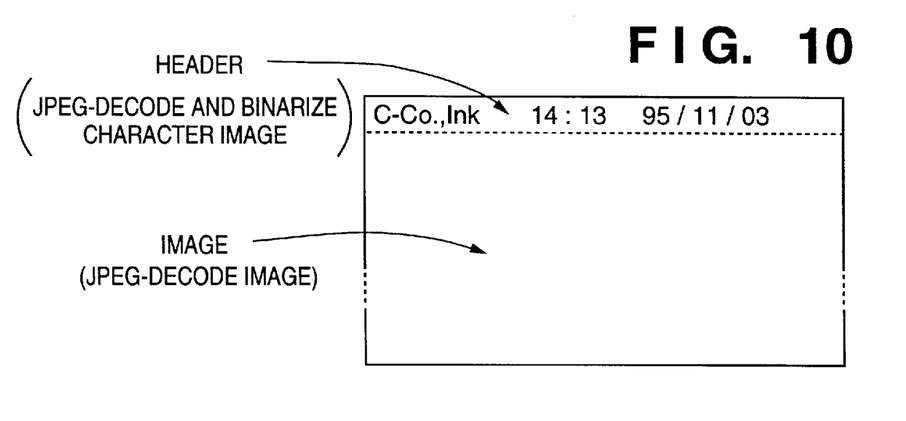
FIG. 10 is a view showing image synthesis in reception.

The output image data is transferred to the printer 805 and the image is recorded. FIG. 10 shows the output image.

The present invention can be applied to a system constituted by a plurality of devices, such as a host computer, an interface, and a printer, or to an apparatus comprising a single device, such as a copying machine.

In this embodiment as described above, by applying the first or second embodiment to a header of facsimile communication, it is possible to perform image communication while suppressing deterioration in characters of the header.

Also, the present invention is also applicable to a case where operations equivalent to those of the above embodiments are achieved by supplying a program, which is stored in a storage medium to realize the operations described above, to a system or apparatus.

In the present invention as has been described above, in performing block coding by synthesizing a character image on an image, the coding can be performed with little deterioration in the image quality of the character image by properly controlling the enlargement ratio of the characters to be synthesized or the synthesis positions of the characters.

It is also possible to perform coding with little deterioration in the image quality of a character image when image data containing character image data is irreversibly coded in units of blocks and transmitted.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:

generating means for generating first data of a character image;

enlarging means for enlarging the first data by an enlargement ratio to provide enlarged second data of an enlarged character image constructed by plural dots, each dot including plural pixels having a same value;

synthesizing means for synthesizing the second data of the enlarged character image with data of another image to generate third data of a synthesized image;

coding means for coding the third data of the synthesized image by dividing the third data into blocks having a block size equal to nxn pixels and coding the divided data block by block to provide coded data; and control means for controlling said synthesizing means such that each dot of the enlarged character image does not cross a boundary of a corresponding block, to reduce coding block distortion during the performance of the coding by said coding means, wherein the enlargement ratio used by said enlarging means is restricted such that a size of each of the dots is one of a fraction of the block size and an integer multiple of the block size, the fraction being a reciprocal of an even number.

2. The apparatus according to claim 1, wherein said generating means receives a character code and generates the first data in accordance with the character code.

3. The apparatus according to claim 1, wherein said apparatus is a facsimile apparatus, said facsimile apparatus further comprising transmitting means for transmitting the coded data to an external device via a modem.

4. The apparatus according to claim 1, wherein said coding means encodes the third data by JPEG coding.

5. The apparatus according to claim 1, further comprising a low-pass filter for eliminating a high frequency component of the enlarged character image.

6. An image processing method comprising the steps of:

generating first data of a character image;

enlarging the first data by an enlargement ratio to provide enlarged second data of an enlarged character image constructed by plural dots, each dot including plural pixels having a same value;

synthesizing the second data of the enlarged character image with data of another image to generate third data of a synthesized image; and coding the third data of the synthesized image by dividing the third data into blocks having a block size equal to nxn pixels and coding the divided data block by block to provide coded data, and wherein the synthesizing step is performed such that each dot of the enlarged character image does not cross a boundary of a corresponding block, thereby enabling coding block distortion to be reduced during the coding step, wherein the enlargement ratio used in said enlarging step is restricted such that a size of each of the dots is one of a fraction of the block size and an integer multiple of the block size, the fraction being a reciprocal of an even number.

* * * * *

UNITED STATES PATENT AND TRADEMARK OFFICE
CERTIFICATE OF CORRECTION

PATENT NO.    : 6,069,980
DATED         : May 30, 2000
INVENTOR(S)   : NORIKAZU HONDA

It is certified that error appears in the above-identified patent and that said Letters Patent is hereby corrected as shown below:

ON THE TITLE PAGE:

[75] Inventor:

"Norikazu Honda, Kanagawa-ken, Japan" should read
--Norikazu Honda, Yokohama-shi, Japan--; and

[56] References Cited,

Under U.S. PATENT DOCUMENTS

"IIasselmeier" should read --Hasselmeier--.

COLUMN 6:

Line 48, "data, and" should read --data,--; and
Line 54, "step," should read --step, and--.

Signed and Sealed this

Twenty-fourth Day of April, 2001

Attest:

NICHOLAS P. GODICI

Attesting Officer    Acting Director of the United States Patent and Trademark Office